(12) United States Patent
Boeltl (10) Patent No.: US 10,052,000 B2
(45) Date of Patent: Aug. 21, 2018

(54) LIGATURE RESISTANT TOILET

(71) Applicant: Acorn Engineering Company, City of Industry, CA (US)

(72) Inventor: Darryl Boeltl, Whittier, CA (US)

(73) Assignee: Acorn Engineering Company, City of Industry, CA (US)

( * ) Notice: Subject to any disclaimer, the term of this patent is extended or adjusted under 35 U.S.C. 154(b) by 95 days.

(21) Appl. No.: 15/071,159

(22) Filed: Mar. 15, 2016

(65) Prior Publication Data

US 2017/0265694 A1 Sep. 21, 2017

(51) Int. Cl.
*A47K 13/26* (2006.01)
*A47K 13/00* (2006.01)
*F16B 35/00* (2006.01)

(52) U.S. Cl.
CPC .............. *A47K 13/26* (2013.01); *A47K 13/00* (2013.01); *F16B 35/005* (2013.01)

(58) Field of Classification Search
CPC ...................................................... A47K 13/26
USPC ........................... 4/242.1, 237–241; D23/311
See application file for complete search history.

(56) References Cited

U.S. PATENT DOCUMENTS

| | | | | |
|---|---|---|---|---|
| 571,244 A | * | 11/1896 | Reed | A47K 13/00 4/237 |
| 1,335,095 A | * | 3/1920 | De Guenther | A47K 13/26 4/216 |
| 3,364,505 A | * | 1/1968 | Palmier | A47K 13/28 4/239 |
| 3,843,977 A | * | 10/1974 | Garnett | E03D 11/02 4/421 |
| 5,937,449 A | | 8/1999 | Rey | |
| 2009/0013454 A1 | * | 1/2009 | Landsberger | A47K 13/005 4/237 |
| 2011/0131717 A1 | | 6/2011 | Beale | |

(Continued)

FOREIGN PATENT DOCUMENTS

DE 20316260 U1 4/2004

OTHER PUBLICATIONS

Gentworks Ltd., White Stainless Steel Toilet Pan with Contoured Seat—Back to Wall, retrieved from internet Mar. 15, 2016, <http://www.gentworks.co.uk/colour-glaze-stainless-steel-toilet pan-with-contoured-seat-back-to-wall.html>.

(Continued)

*Primary Examiner* — Erin Deery
(74) *Attorney, Agent, or Firm* — Eric J. Sosenko; Jonathan P. O'Brien; Honigman Miller Schwartz and Cohn LLP (57) ABSTRACT

A toilet includes a bowl and a seat. The bowl includes a base and a rim. The base includes an inner surface and an outer surface. The rim includes an upper surface and an inner surface. The inner surface of the rim extends from the inner surface of the base. The seat includes a plate portion, a neck portion, a skirt portion, a first fastening tab, and a second fastening tab. The plate portion includes an inner edge and an outer edge. The neck portion extends axially from the inner edge of the plate portion. The first fastening tab extends from the neck portion and includes a first aperture having an axis configured to intersect one of the inner surface of the rim and the inner surface of the base. The second fastening tab extends from the neck portion and including a second aperture.

20 Claims, 5 Drawing Sheets

(56) References Cited

U.S. PATENT DOCUMENTS

2015/0020301 A1   1/2015   Moore

OTHER PUBLICATIONS

Thomas Dudley Ltd., Dudley Resan, Resan Range, retrieved from internet Mar. 15, 2016, <http://www.dudleyresan.co.uk/products.php?sef_rewrite=1>.
Commercial Washrooms, DVS Back to Wall Vandal Resistant Toilet Pan, retrieved from internet Mar. 15, 2016, <https://www.commercialwashroomsltd.co.uk/products/commercial-sanitary-ware/commercial-toilets/back-to-wall-toilets/dvs-back-to-wall-vandal-resistant-toilet-pan>.
Wallgate, CWC-80 Public Back-to-Wall WC Pan Range, retrieved from internet Mar. 15, 2016, <http://www.wallgate.com/products/wc-and-toilet-range/cwc-80-series-public-back-to-wall-pans>.

* cited by examiner

LIGATURE RESISTANT TOILET

FIELD

The present disclosure relates to a toilet and more particularly to a ligature resistant toilet.

BACKGROUND

This section provides background information related to the present disclosure and is not necessarily prior art.

Toilets typically include a bowl and a seat. Often the seat is hingedly mounted to the bowl such that the seat can be rotated between two positions (e.g., a down position and an up position). On some toilets, the bowl and the seat may be monolithically formed, such that the seat cannot be rotated relative to, or otherwise removed from, the bowl. Such toilets may be referred to as ligature-free toilets, in that the toilet does not include any fasteners that would allow a person to move the seat relative to, or otherwise remove the seat from, the bowl. Accordingly, the seat of a ligature-free toilet cannot be used by a person to cause harm to such person, another person, or the person's surroundings.

While conventional ligature-free toilets may have proven useful for their intended purposes, a continuous need for improvement in the relevant art remains.

DRAWINGS

The drawings described herein are for illustrative purposes only of selected configurations and are not intended to limit the scope of the present disclosure.

Corresponding reference numerals indicate corresponding parts throughout the drawings.

SUMMARY

This section provides a general summary of the disclosure, and is not a comprehensive disclosure of its full scope or all of its features.

In some aspects of the present disclosure, a toilet is provided. The toilet may include a bowl and a seat and may further include a base and a rim. The base may include an inner surface and an outer surface. The rim may include an upper surface and an inner surface. The inner surface of the rim may extend from the inner surface of the base. The seat may include a plate portion, a neck portion, a skirt portion, a first fastening tab, and a second fastening tab. The plate portion may include an inner edge and an outer edge. The neck portion may extend axially from the inner edge of the plate portion. The skirt portion may extend axially from the outer edge of the plate portion. The first fastening tab may extend from the neck portion and may include a first aperture having an axis configured to intersect one of the inner surface of the rim and the inner surface of the base. The second fastening tab may extend from the neck portion and may include a second aperture.

In some implementations, the first fastening tab is disposed proximate a front portion of the toilet seat and the second fastening tab is disposed proximate a rear portion of the toilet seat.

In some implementations, the first fastening tab includes a first inner surface and a first outer surface, the first inner surface defining an angle α with the first outer surface. The angle α may be between ten degrees and fifty degrees. The first inner surface may extend in a vertical direction.

In some implementations, the toilet includes a first fastener disposed in the first aperture and a second fastener disposed in the second aperture. At least one of the first fastener and the second fastener may include a set screw. In some implementations, a fin portion may extend radially from the plate portion. The fin portion may include a third aperture. In some implementations, the first aperture may include a first central axis extending in a first direction, the second aperture may include a second central axis extending in a second direction transverse to the first direction, and the third aperture may include a third central axis extending in a third direction transverse to the first direction and the second direction.

In other aspects of the present disclosure, a toilet seat is provided. The toilet seat may include a plate portion, a neck portion, a skirt portion, a first fastening tab, and a second fastening tab. The plate portion may include an inner edge and an outer edge. The neck portion may extend axially from the inner edge of the plate portion. The skirt portion may extend axially from the outer edge of the plate portion. The first fastening tab may extend from the neck portion and may include a first aperture. The second fastening tab may extend from the neck portion and may include a second aperture.

In some implementations, the toilet seat includes a first fastener disposed in the first aperture and a second fastener disposed in the second aperture.

In some implementations, the toilet seat includes a fin portion extending radially from the plate portion. The fin portion may include a third aperture. The third aperture may extend in a vertical direction. The first aperture may include a first central axis extending in a first direction. The second aperture may include a second central axis extending in a second direction transverse to the first direction. The third aperture may include a third central axis extending in a third direction transverse to the first direction and the second direction. In some implementations, the first aperture and the second aperture are not visible along a vertically-extending line-of-sight.

The details of one or more implementations of the disclosure are set forth in the accompanying drawings and the description below. Other aspects, features, and advantages will be apparent from the description and drawings, and from the claims.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

With reference to FIGS. 1A-3, a ligature resistant toilet 10 is provided. In some implementations, the toilet 10 may be configured for use in a prison or other environment where it is desirable to have a toilet seat that does not include ligatures.

Figure 3:
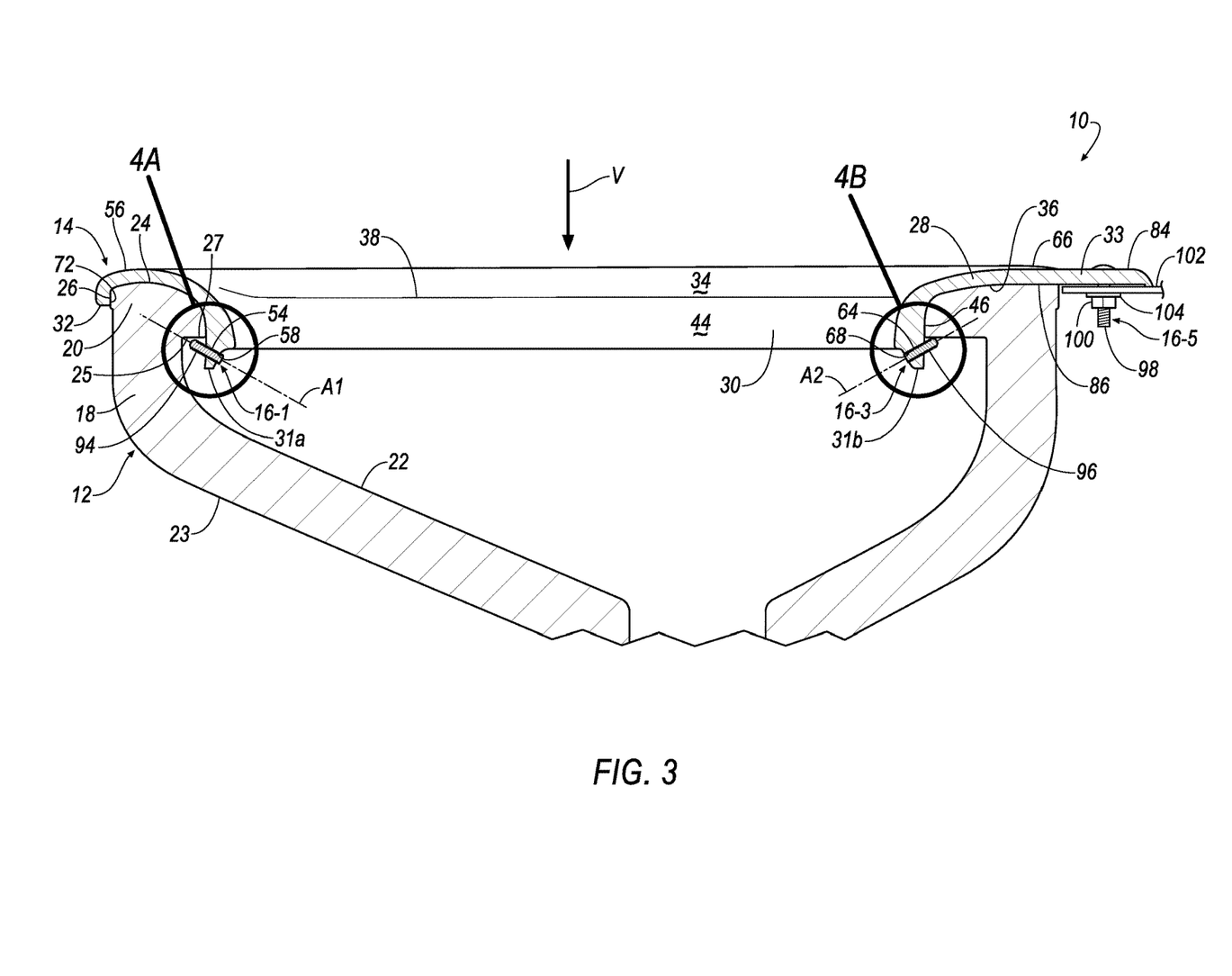
FIG. 3 is a cross-sectional view of the ligature resistant toilet of FIG. 1A.
Figure 4A:
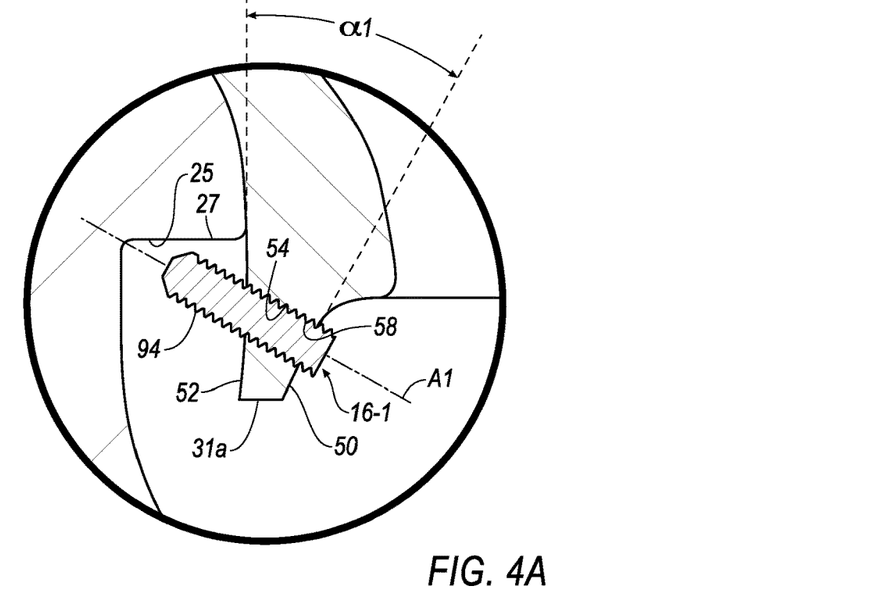
FIG. 4A is a magnified view of a portion of the cross section shown in FIG. 3.
Figure 4B:
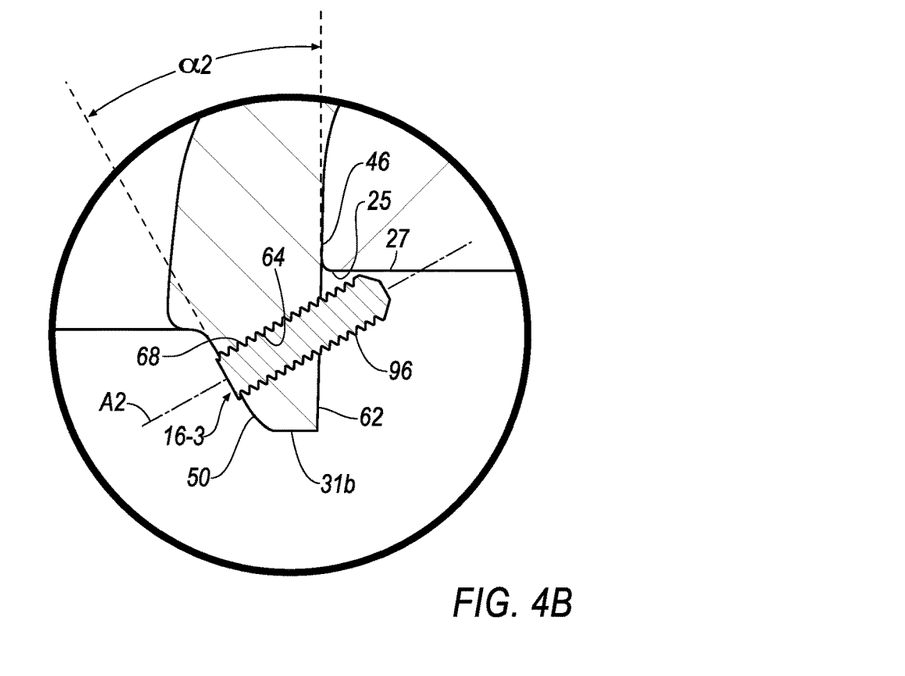
FIG. 4B is a magnified view of a portion of the cross section shown in FIG. 3.

The toilet 10 may include a bowl 12, a seat 14, and a plurality of fasteners 16-1, 16-2, . . . 16-n. The bowl 12 may include a base 18 and a rim 20. In some implementations, the base 18 may be integrally and/or monolithically formed with the rim 20, such that the bowl 12 is a unitary construct. With reference to FIG. 3, the base 18 may include an inner surface 22 and an outer surface 23 opposite the inner surface 22. The rim 20 may include an upper surface 24, a lower surface 25 opposite the upper surface 24, and an outer surface 26. The upper surface 24 may include a convex shape or contour and may extend from and between the outer surface 26 and the lower surface 25. In this regard, the upper surface 24 and/or the lower surface 25 may extend radially inward (e.g., horizontal) relative to at least a portion of the inner surface 22 of the base 18, such that the lower surface 25 defines a shoulder or lip 27. In some configurations, the upper and lower surfaces 24, 25, including the lip 27, extend annularly about the bowl 12.

The seat 14 may include a plate portion 28, a neck portion 30, a first fastening tab 31a, a second fastening tab 31b, a skirt portion 32, and a fin portion 33. The plate portion 28 may include an outer surface 34 and an inner surface 36. The outer surface 34 may form a seat surface of the seat 14 and may include a convex shape or contour. The inner surface 36 may oppose the outer surface 34. In this regard, the inner surface 36 may include a concave shape or contour extending from a radially inner peripheral edge 38 to a radially outer peripheral edge 40.

The neck portion 30 may include an outer surface 44 and an inner surface 46. The outer surface 44 may be contiguous with the outer surface 34 of the plate portion 28, and the inner surface 46 may be contiguous with the inner surface 36 of the plate portion 28. The neck portion 30 may extend from the plate portion 28 in a direction transverse to the inner surface 36 of the plate portion 28. For example, in some implementations, the neck portion 30, including the inner surface 46, may extend in an axial or vertically-extending direction from the plate portion 28, generally perpendicular to at least a portion of the inner surface 36. The neck portion 30 may further extend annularly about the plate portion 28. In particular, the neck portion 30 may extend annularly from and about the inner peripheral edge 38 of the plate portion 28.

Figure 1A:
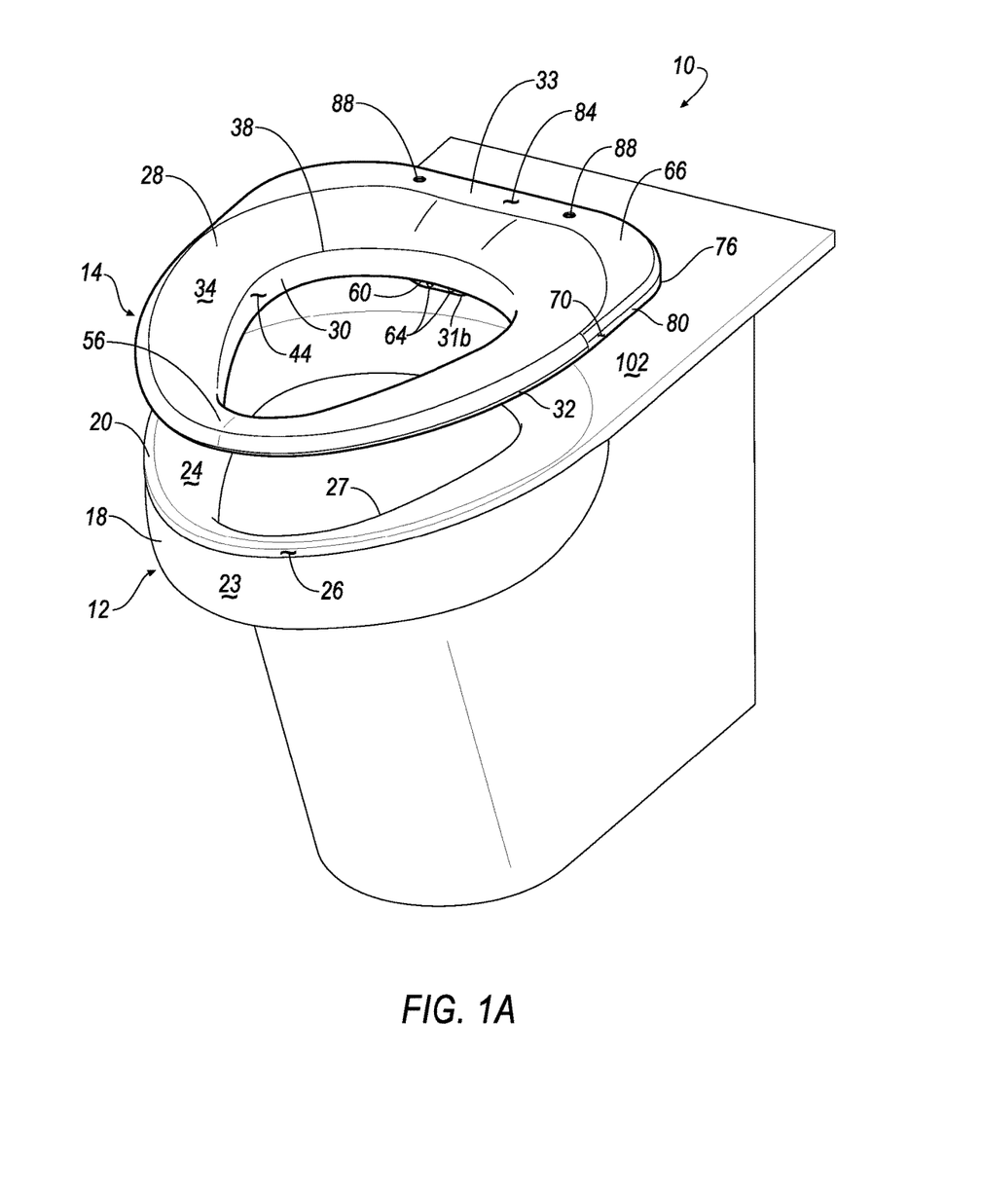
FIG. 1A is a perspective view of a ligature resistant toilet having a seat in accordance with the principles of the present disclosure, the seat shown in a first position.
Figure 1B:
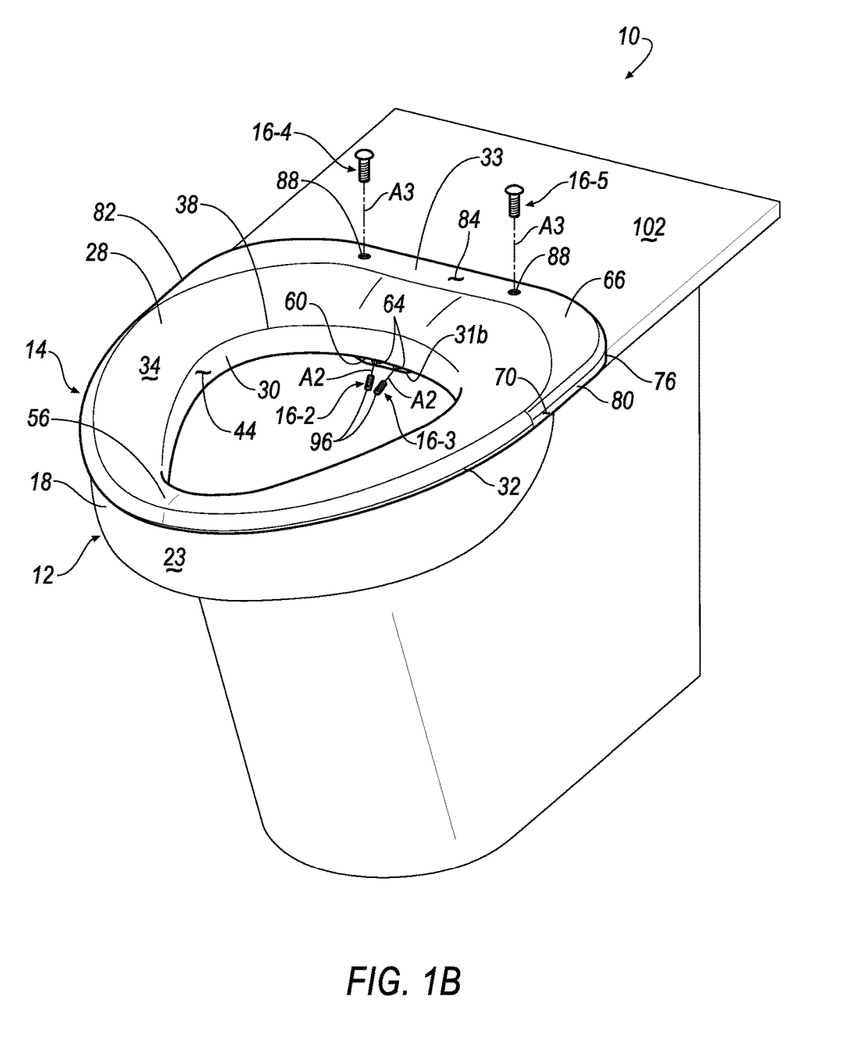
FIG. 1B is a perspective view of the ligature resistant toilet of FIG. 1A, the seat shown in a second position.
Figure 2:
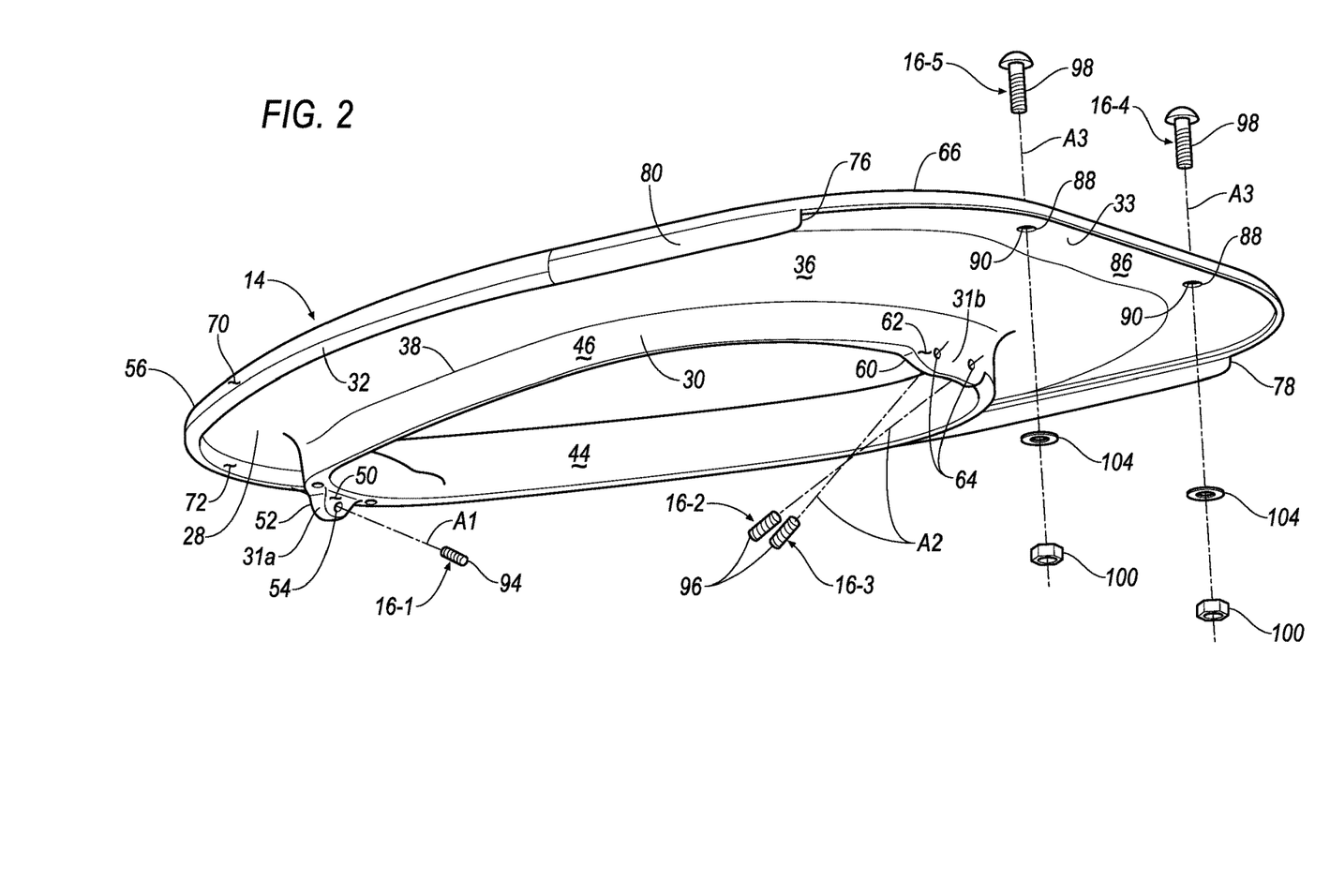
FIG. 2 is a partial exploded view of the ligature resistant toilet of FIG. 1A showing a seat of the ligature resistant toilet of FIG. 1A.

With reference to FIGS. 2 and 3, the first fastening tab 31a may include an outer surface 50, an inner surface 52, and at least one aperture 54. In some implementations, the first fastening tab 31a may be disposed at a front side 56 of the seat 14. The outer surface 50 may be contiguous with the outer surface 44 of the neck portion 30. The inner surface 52 may be contiguous with the inner surface 46 of the neck portion 30. In some implementations, the first fastening tab 31a extends from the neck portion 30 in an axial direction. In this regard, the outer surface 50 and/or the inner surface 52 may extend in a direction substantially parallel to the inner surface 46 of the neck portion 30. As illustrated in FIG. 3, in some implementations, the outer surface 50 may extend in a direction transverse to the outer surface 44 of the neck portion 30 such that the outer surface 50 and the inner surface 52 define an angle α1 therebetween. In particular, the angle α1 may be defined by the outer surface 50 and an axial or vertically extending direction or line-of-sight (V). The angle α1 may be between ten degrees and fifty degrees. In some configurations, the angle α1 may be equal to thirty-five degrees.

The aperture 54 may include a threaded portion 58 and a central axis A1. The aperture 54 may extend through the outer surface 50 and/or the inner surface 52 of the first fastening tab 31a such that the axis A1 extends in a direction substantially perpendicular (+/−5%) to the outer surface 50.

With reference to FIGS. 2 and 3, the second fastening tab 31b may include an outer surface 60, an inner surface 62, and at least one aperture 64. In some implementations, the second fastening tab 31b may be disposed at a rear side 66 of the seat 14, opposite the front side 56. The outer surface 60 may be contiguous with the outer surface 44 of the neck portion 30. The inner surface 62 may be contiguous with the inner surface 46 of the neck portion 30. In some implementations, the second fastening tab 31b extends from the neck portion 30 in an axial direction. In this regard, the outer surface 60 and/or the inner surface 62 may extend in a direction substantially parallel to the inner surface 46 of the neck portion 30. As illustrated in FIG. 3, in some implementations, the outer surface 60 may extend in a direction transverse to the outer surface 44 of the neck portion 30 such that the outer surface 60 and the inner surface 62 define an angle α2 therebetween. In particular, the angle α2 may be defined by the outer surface 60 and the axial or vertically extending direction or line-of-sight (V). The angle α2 may be between ten degrees and fifty degrees. In some configurations, the angle α2 may be equal to thirty-five degrees.

The aperture 64 may include a threaded portion 68 and a central axis A2. As illustrated in FIG. 2, in some implementations, the second fastening tab 31b may include two apertures 64. The aperture 64 may extend through the outer surface 60 and/or the inner surface 62 of the second fastening tab 31b such that the axis A2 extends in a direction substantially perpendicular (+/−5%) to the outer surface 60, and the axis A2 of a first of the apertures 64 is transverse to the axis A2 of a second of the apertures 64. In this regard, the axis A2 of one or more of the apertures 64 may extend in a direction transverse to the axis A1. For example, in some configurations the axis A2 may be substantially perpendicular to the axis A1.

The skirt portion 32 of the seat 14 may include an outer surface 70 and an inner surface 72. The outer surface 70 may be contiguous with the outer surface 34 of the plate portion 28, and the inner surface 72 may be contiguous with the inner surface 36 of the plate portion 28. The skirt portion 32 may extend from the plate portion 28 in a direction transverse to the inner surface 36 of the plate portion 28. For example, in some implementations, the skirt portion 32, including the inner surface 72, may extend in an axial or vertically-extending direction from the plate portion 28, generally perpendicular to at least a portion of the inner surface 36. The skirt portion 32 may further extend about at least a portion of the plate portion 28. In particular, the skirt portion 32 may extend from a proximal end 76 to a distal end 78. The proximal end 76 may be disposed on a lateral side 80 of the seat 14 and the distal end 78 may be disposed on a medial side 82 of the seat, opposite the lateral side 80.

The fin portion 33 may include an outer surface 84, an inner surface 86, and at least one aperture 88. The outer surface 84 may be contiguous with the outer surface 34 of the plate portion 28, and the inner surface 86 may be contiguous with the inner surface 36 of the plate portion 28. The fin portion 33 may extend from the plate portion 28 in a direction generally parallel to the inner surface 36 of the plate portion 28. For example, in some implementations, the fin portion 33, including the inner surface 86, may extend in a radial or horizontally-extending direction from the plate portion 28, generally parallel to at least a portion of the inner surface 36. The fin portion 33 may be disposed at the rear side 66 of the seat 14. In particular, the fin portion 33 may be disposed between the proximal end 76 and the distal end 78 of the skirt portion 32.

The aperture 88 may include a threaded portion 90 and a central axis A3. As illustrated in FIG. 2, in some implementations, the fin portion 33 may include two apertures 88. The aperture 88 may extend through the outer surface 84 and/or the inner surface 86 of the fin portion 33 such that the axis A3 extends in a direction substantially perpendicular (+/− 5%) to the inner surface 86. In this regard, the axis A3 may extend in a substantially vertical direction.

The plurality of fasteners 16-1, 16-2, . . . 16-n may include a first fastener 16-1, a second fastener 16-2, a third fastener 16-3, a fourth fastener 16-4, and a fifth fastener 16-5. The first fastener 16-1 may include a set screw, or other suitable mechanical fastener (e.g., bolt), having a threaded portion 94 that threadably engages the threaded portion 58 of the aperture 54. The second and third fasteners 16-2, 16-3 may include a set screw, or other suitable mechanical fastener (e.g., bolt), having a threaded portion 96 that threadably engages the threaded portion 68 of the aperture 64. The fourth and fifth fasteners 16-4, 16-5 may include a screw, bolt, or other suitable mechanical fastener having a threaded portion 98 that threadably engages the threaded portion 90 of the aperture 88. In some implementations, the fourth and/or fifth fasteners 16-4, 16-5 may threadably engage a nut 100. While the fasteners 16-1, 16-2, . . . 16-n are generally shown and described herein as being mechanical fasteners, such as set screws and/or bolts, it will be appreciated that one or more of the fasteners 16-1, 16-2, . . . 16-n may include other types of fasteners and/or fastening mechanisms within the scope of the present disclosure. For example, one or more of the first fastener 16-1, the second fastener 16-2, the third fastener 16-3, the fourth fastener 16-4, and the fifth fastener 16-5 may include an adhesive material (e.g., glue, tape, etc.), a hook-and-loop material, and a magnet, for example. In this regard, as will be explained in more detail below, the first fastener 16-1, the second fastener 16-2, the third fastener 16-3, the fourth fastener 16-4, and/or the fifth fastener 16-5 may include any type of fastener suitable to secure the seat 14 to the toilet 12.

With reference to FIGS. 1B-3, in an assembled configuration, the seat 14 may be disposed on the toilet 12 such that the seat 14 is secured to the rim 20. In particular, (i) the inner surface 72 of the skirt portion 32 may engage the outer surface 26 of the rim 20, (ii) the inner surface 46 of the neck portion 30 may engage the upper surface 24 of the rim 20, and (iii) the inner surface 86 of the fin portion 33 may engage an outer surface 102 of the bowl 12.

The first fastener 16-1 may be disposed within the aperture 54 such that the first fastener 16-1 engages the lower surface 25 of the rim 20. In this regard, in the assembled configuration, the axis A1 of the aperture 54 may intersect one of (i) the lower surface 25 of the rim 20 and (ii) the inner surface 22 of the base 18. The second and third fasteners 16-2, 16-3 may each be disposed in one of the apertures 64 such that the second and third fasteners 16-2, 16-3 engage the lower surface 25 of the rim 20. In this regard, in the assembled configuration, the axis A2 of the aperture 64 may intersect the lower surface 25 of the rim 20. The fourth and fifth fasteners 16-4, 16-5 may each be disposed in one of the apertures 88 such that the fourth and fifth fasteners 16-4, 16-5 extend through the outer surface 102 of the bowl 12. In this regard, the nut 100 and/or a washer 104 may be coupled to the fourth and/or fifth fasteners 16-4, 16-5 such that the bowl 12, including the outer surface 102, is disposed between the fin portion 33 of the seat 14 and the nut 100 and/or the washer 104.

The configuration of the toilet 10, including the bowl 12 and the seat 14, can allow a user to secure the seat 14 to the bowl 12 without exposing or otherwise creating any ligature points. In particular, the configuration of the surfaces, apertures, fasteners, etc. described herein help to create an easy-to-use, ligature resistant toilet 10.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A toilet comprising:
a bowl having a base and a rim, the base including an inner surface and an outer surface, the rim including an upper surface and an inner surface, the inner surface of the rim extending from the inner surface of the base; and
a monolithically formed seat including:
a plate portion;
a neck portion extending axially and defining a radially innermost edge of the seat;
a skirt portion extending axially and defining a radially outermost edge of the seat, the plate portion extending between the neck portion and the skirt portion;
a first fastening tab having a first extended portion extending from the neck portion and including a first aperture through the first extended portion and having a first axis configured to intersect one of the inner surface of the rim and the inner surface of the base; and
a second fastening tab having a second extended portion extending from the neck portion and including a second aperture through the second extended portion and having a second axis configured to intersect one of the inner surface of the rim and the inner surface of the base.

2. The toilet of claim 1, wherein the first fastening tab is disposed proximate a front portion of the toilet seat and the second fastening tab is disposed proximate a rear portion of the toilet seat.

3. The toilet of claim 1, wherein the first fastening tab includes a first inner surface and a first outer surface, the first inner surface defining an angle α with the first outer surface.

4. The toilet of claim 3, wherein the angle α is between ten degrees and fifty degrees.

5. The toilet of claim 4, wherein the first inner surface extends in a vertical direction.

6. The toilet of claim 1, further comprising a first fastener disposed in the first aperture and a second fastener disposed in the second aperture.

7. The toilet of claim 6, wherein at least one of the first fastener and the second fastener includes a set screw.

8. The toilet of claim 6, further comprising a fin portion extending radially from the plate portion, the fin portion including a third aperture.

9. The toilet of claim 8, wherein the first aperture includes a first central axis extending in a first direction, the second aperture includes a second central axis extending in a second direction transverse to the first direction, and the third aperture includes a third central axis extending in a third direction transverse to the first direction and the second direction.

10. A toilet seat comprising:
a plate portion;
an axially extending neck portion defining a radially innermost edge of the seat;
an axially extending skirt portion defining a radially outermost edge of the seat, the plate portion extending between the neck portion and the skirt portion;
a first fastening tab having a first extended portion extending from the neck portion and including a first aperture provided through the first extended portion; and
a second fastening tab having a second extended portion extending from the neck portion and including a second aperture provided through the extended portion; and
wherein the seat is monolithically formed.

11. The toilet seat of claim 10, wherein the first fastening tab is disposed proximate a front portion of the toilet seat and the second fastening tab is disposed proximate a rear portion of the toilet seat.

12. The toilet seat of claim 10, wherein the first fastening tab includes a first inner surface and a first outer surface, the first inner surface defining an angle α with the first outer surface.

13. The toilet seat of claim 12, wherein the angle α is between ten degrees and fifty degrees.

14. The toilet seat of claim 13, wherein the first inner surface extends in a vertical direction.

15. The toilet seat of claim 10, further comprising a first fastener disposed in the first aperture and a second fastener disposed in the second aperture.

16. The toilet seat of claim 15, wherein at least one of the first fastener and the second fastener includes a set screw.

17. The toilet seat of claim 15, further comprising a fin portion extending radially from the plate portion, the fin portion including a third aperture.

18. The toilet seat of claim 17, wherein the third aperture extends in a vertical direction.

19. The toilet seat of claim 17, wherein the first aperture includes a first central axis extending in a first direction, the second aperture includes a second central axis extending in a second direction transverse to the first direction, and the third aperture includes a third central axis extending in a third direction transverse to the first direction and the second direction.

20. The toilet seat of claim 19, wherein the first aperture and the second aperture are not visible along a vertically-extending line-of-sight.

* * * * *